(12) United States Patent
Xu et al.

(10) Patent No.: US 9,899,910 B2
(45) Date of Patent: Feb. 20, 2018

(54) BRIDGELESS PFC POWER CONVERTER WITH REDUCED EMI NOISE

(71) Applicant: Flextronics AP, LLC, Broomfield, CO (US)

(72) Inventors: Hua Min Xu, Shenzhen (CN); Wei Li, Shenzhen (CN); Hui Zhang, Shenzhen (CN); Xing Hao Zhang, Shenzhen (CN); Yi Zhang, Shenzhen (CN)

(73) Assignee: FLEXTRONICS AP, LLC, Broomfield, CO (US)

( * ) Notice: Subject to any disclaimer, the term of this patent is extended or adjusted under 35 U.S.C. 154(b) by 0 days.

(21) Appl. No.: 14/262,660

(22) Filed: Apr. 25, 2014

(65) Prior Publication Data

US 2014/0354247 A1    Dec. 4, 2014

Related U.S. Application Data

(60) Provisional application No. 61/829,119, filed on May 30, 2013.

(51) Int. Cl.
*H02M 7/06* (2006.01)
*H02M 1/42* (2007.01)

(52) U.S. Cl.
CPC ......... *H02M 1/4225* (2013.01); *Y02B 70/126* (2013.01)

(58) Field of Classification Search
CPC ...... H02M 1/32; H02M 7/06; H02M 3/33592; G05F 1/70; Y02B 70/126
USPC .......................... 363/125–127; 323/205, 207
See application file for complete search history.

(56) References Cited

U.S. PATENT DOCUMENTS

| | | | | |
|---|---|---|---|---|
| 7,215,560 B2* | 5/2007 | Soldano | ............... | H02M 1/4225 363/44 |
| 7,630,221 B2* | 12/2009 | Sui | ............ | G05F 1/70 323/207 |
| 8,233,298 B2* | 7/2012 | Jang | ..................... | H02M 1/4208 363/67 |
| 8,363,434 B2* | 1/2013 | Lin | ..................... | H02M 1/4208 363/127 |
| 8,780,597 B2* | 7/2014 | Xu | ........................ | H02M 1/44 363/127 |
| 2006/0198172 A1* | 9/2006 | Wood | .................. | H02M 1/4233 363/89 |
| 2006/0208711 A1* | 9/2006 | Soldano | ............. | H02M 1/4225 323/225 |

(Continued)

*Primary Examiner* — Adolf Berhane
(74) *Attorney, Agent, or Firm* — Haverstock & Owens LLP (57) ABSTRACT

A bridgeless PFC boost converter has either a single switching cell or two identical switching cells configured to operate 180 degrees out of phase. A switching cell includes first and second transistor switches coupled to opposing ends of an input AC voltage source, and first and second rectifying diodes, one rectifying diode coupled in series to each of the two transistor switches. A boost inductor is coupled to a junction node between each transistor switch and rectifying diode series. Either a third rectifying diode or a third transistor switch is coupled to a junction node between the input AC voltage source and the first transistor switch. Either a fourth rectifying diode or a fourth transistor switch is coupled to a junction node between the input AC voltage source and the second transistor switch. The rectifying diodes are coupled an output capacitor. Two switching cells can be interleaved.

28 Claims, 4 Drawing Sheets

(56) References Cited

U.S. PATENT DOCUMENTS

| | | | | |
|---|---|---|---|---|
| 2007/0279955 | A1* | 12/2007 | Liu | H02M 1/4208 363/125 |
| 2008/0002444 | A1* | 1/2008 | Shekhawat | H02M 1/34 363/127 |
| 2010/0277837 | A1* | 11/2010 | Myhre | H02M 1/4225 361/18 |
| 2011/0037444 | A1* | 2/2011 | Wildash | H02M 1/44 323/210 |
| 2012/0268084 | A1* | 10/2012 | Wang | H02M 1/44 323/208 |
| 2013/0003427 | A1* | 1/2013 | Pan | H02M 1/4225 363/44 |
| 2013/0016545 | A1* | 1/2013 | Xu | H02M 1/44 363/126 |

* cited by examiner

BRIDGELESS PFC POWER CONVERTER WITH REDUCED EMI NOISE

RELATED APPLICATIONS

This Patent Application claims priority under 35 U.S.C. 119 (e) of the co-pending U.S. Provisional Application Ser. No. 61/829,119, filed May 30, 2013, and entitled "Bridgeless PFC Power Converter with High Efficiency". This application incorporates U.S. Provisional Application Ser. No. 61/829,119 in its entirety by reference.

FIELD OF THE INVENTION

The present invention is generally directed to the power converters. More specifically, the present invention is directed to a bridgeless power factor correction (PFC) power converter with reduced EMI noise.

BACKGROUND OF THE INVENTION

Power conversion refers to the conversion of one form of electrical power to another desired form and voltage, for example converting 115 or 230 volt alternating current (AC) supplied by a utility company to a regulated lower voltage direct current (DC) for electronic devices, referred to as AC-to-DC power conversion.

A switched-mode power supply, switching-mode power supply or SMPS, is a power supply that incorporates a switching regulator. While a linear regulator uses a transistor biased in its active region to specify an output voltage, an SMPS actively switches a transistor between full saturation and full cutoff at a high rate. The resulting rectangular waveform is then passed through a low-pass filter, typically an inductor and capacitor (LC) circuit, to achieve an approximated output voltage. The switch mode power supply uses the high frequency switch, the transistor, with varying duty cycle to maintain the output voltage. The output voltage variations caused by the switching are filtered out by the LC filter.

An SMPS can provide a step-up, step-down or inverted output voltage function. An SMPS converts an input voltage level to another level by storing the input energy temporarily and then releasing the energy to the output at a different voltage. The storage may be in either electromagnetic components, such as inductors and/or transformers, or electrostatic components, such as capacitors.

Advantages of the SMPS over the linear power supply include smaller size, better power efficiency, and lower heat generation. Disadvantages include the fact that SMPSs are generally more complex than linear power supplies, generate high-frequency electrical noise that may need to be carefully suppressed, and have a characteristic ripple voltage at the switching frequency.

High-frequency ripple results when passing current through the transistor switches and then filtering the current with passive components. The frequency components of the ripple are dependent on both the switching frequency and the switching speeds of the semiconductor switches. The high-frequency ripple generates unwanted electromagnetic interference (EMI) and must be removed to a high degree for the converter to pass standard EMI requirements.

Conventional power converters pass EMI requirements by reducing the input and output ripple. Reduction is accomplished by the following methods: large filters, reduction of switching frequency, and/or reduction of switching speeds. Such techniques are commonly practiced in nearly all conventional power converters. However, use of each of these techniques comes with specific drawbacks. Use of large filters adds space and cost. Reduction of switching frequency increases the size of passive components and cost. Reduction of switching speeds reduces efficiency.

The power factor of an AC electric power system is defined as the ratio of the real power to the apparent power, and is a number between 0 and 1. Real power is the capacity of the circuit for performing work in a particular time. Apparent power is the product of the current and voltage of the circuit. Due to energy stored in the load and returned to the source, or due to a non-linear load that distorts the wave shape of the current drawn from the source, the apparent power can be greater than the real power. Low-power-factor loads increase losses in a power distribution system and result in increased energy costs. Power factor correction (PFC) is a technique of counteracting the undesirable effects of electric loads that create a power factor that is less than 1. Power factor correction attempts to adjust the power factor to unity (1.00).

High power applications, and some low power applications, require the converter to draw current from the AC line with a high power factor. Boost converters are commonly used to produce the high power factor input. A bridge rectifier is commonly connected to an input AC voltage for converting the input AC voltage into a full-wave rectified DC voltage before the voltage is stepped-up. However, the rectifying diodes that constitute the bridge rectifier cause considerable conduction loss resulting in power conversion efficiency degradation. As such, conventional PFC boost converters that include a bridge rectifier typically fail to provide sufficient efficiency for high power applications.

Figure 1:
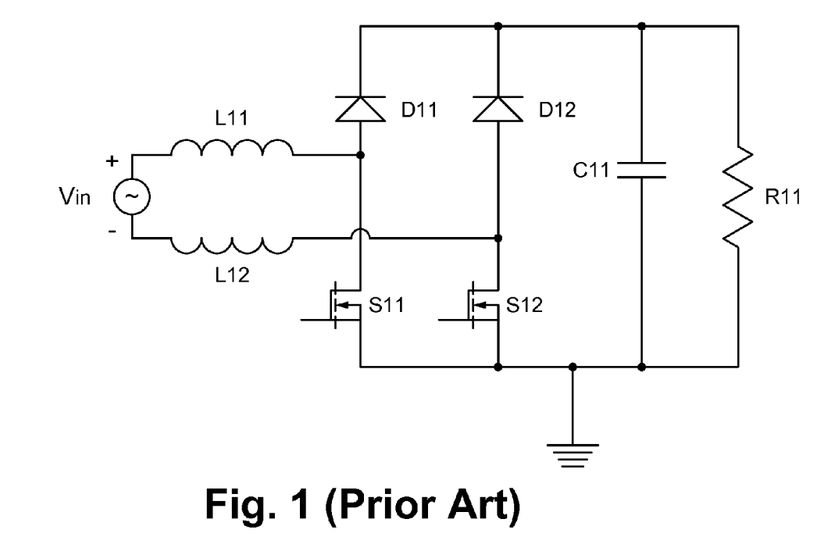
FIG. 1 illustrates a circuit diagram of a conventional bridgeless power factor correction boost converter.

PFC boost converters that do not include a bridge rectifier, commonly referred to as bridgeless PFC boost converters, provide improved efficiency and reduced conduction loss compared to similar PFC boost converters having a bridge rectifier. FIG. 1 illustrates a circuit diagram of a conventional bridgeless power factor correction boost converter. In FIG. 1, a boost inductor L11 is coupled to a first node of an input AC voltage Vin, and a boost inductor L12 is coupled to a second node of the input AC voltage Vin. A transistor switch S11 is coupled to the boost inductor L11, and a transistor switch S12 is coupled to the boost inductor L12. A rectifying diode D11 is coupled to the boost inductor L11 and also in series with the transistor switch S11. A rectifying diode D12 is coupled to the boost inductor L12 and also in series with the transistor switch S12. The rectifying diodes D11, D12 are coupled to an output capacitor C11 through a first bus and the transistor switches S11, S12 are coupled to the output capacitor C11 through a second bus. The output capacitor C11 is coupled to a load R11.

During a positive half-cycle of the input AC voltage Vin, the transistor switch S11 is turned on and an input current is induced to flow toward the boost inductor L11 so as to charge the boost inductor L11. Concurrently with the transistor switch S11 turned on, the transistor switch S12 is also turned on and the current path is closed through the body diode of the transistor switch S12. Next, still during the positive half-cycle of the input AC voltage, the transistor switch S11 is turned off and the energy stored in the boost inductor L11 is discharged to the output capacitor C11 through the rectifying diode D11. The current path is closed through the body diode of the transistor switch S12, where the current path is from the input AC voltage Vin, through the boost inductor L11, through the rectifying diode D11, through the output capacitor C11, through the body diode of the transistor switch S12, through the boost inductor L12 and back to the input AC voltage Vin.

During the negative half-cycle of the input AC voltage Vin, the transistor switch S12 is turned on and an input current is induced to flow toward the boost inductor L12 so as to charge the boost inductor L12. Concurrently with the transistor switch S12 turned on, the transistor switch S11 is also turned on and the current path is closed through the body diode of the transistor switch S11. Next, still during the negative half-cycle of the input AC voltage Vin, the transistor switch S12 is turned off and the energy stored in the boost inductor L12 is discharged to the output capacitor C11 through the rectifying diode D12. The current path is closed through the body diode of the transistor switch S 11. As such, during each half-cycle of the input AC voltage Vin, one transistor switch functions as an active switch and the other transistor switch functions as a rectifying diode. A disadvantage of the converter shown in FIG. 1 is that output voltage value floats compared to the input AC voltage Vin and ground. Another disadvantage is that the converter of FIG. 1 suffers from a severe EMI noise problem due in part to the increase of the parasitical capacitance value between the buses and ground.

Figure 2:
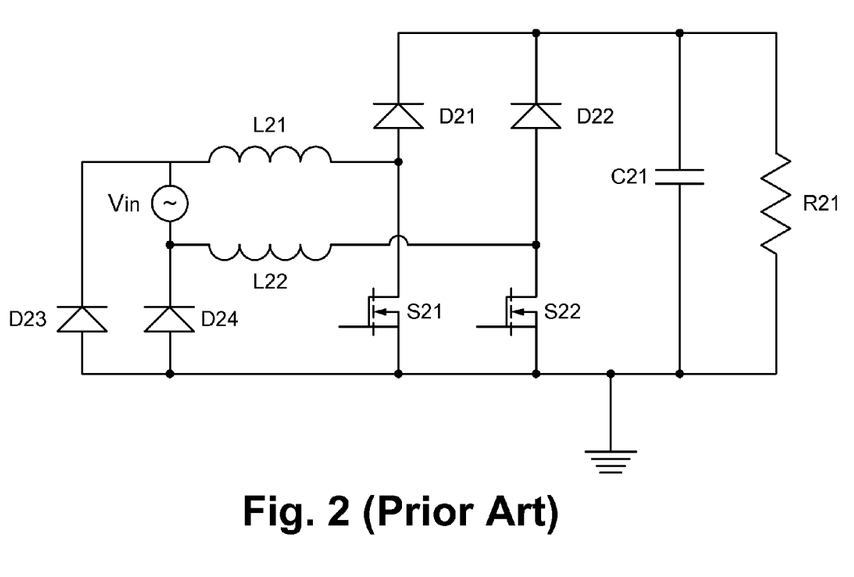
FIG. 2 illustrates a circuit diagram of another conventional bridgeless power factor correction boost converter.

FIG. 2 illustrates a circuit diagram of another conventional bridgeless power factor correction boost converter. The bridgeless power factor correction boost converter of FIG. 2 is a modified circuit diagram of the bridgeless power factor correction boost converter of FIG. 1. The boost inductors L21, L22, the transistor switches S21, S22, the rectifying diodes D21, D22, and the output capacitor C21 of FIG. 2 are configured and operate similarly to the configuration and operation of the of the boost inductors L11, L12, the transistor switches S11, S12, the rectifying diodes D11, D12, and the output capacitor C11, respectively, of FIG. 1. The bridgeless PFC boost converter of FIG. 2 adds a pair of auxiliary diodes D23, D24 to the input side of the converter to more efficiently suppress the EMI noise of the converter. However, power loss across the diodes D23, D24 lowers the circuit efficiency.

SUMMARY OF THE INVENTION

Embodiments are directed to a bridgeless PFC boost converter having either a single switching cell or two identical switching cells configured to operate 180 degrees out of phase. A switching cell includes first and second transistor switches coupled to opposing ends of an input AC voltage source, and first and second rectifying diodes, one rectifying diode coupled in series to each of the two transistor switches. A boost inductor is coupled to a junction node between each transistor switch and rectifying diode series. Either a third rectifying diode or a third transistor switch is coupled to a junction node between the input AC voltage source and the first transistor switch. Either a fourth rectifying diode or a fourth transistor switch is coupled to a junction node between the input AC voltage source and the second transistor switch. Cathodes of the first and second rectifying diodes are commonly coupled to first node of an output capacitor. In the case of two switching cells, the two switching cells are each coupled to the input AC voltage source, the output capacitor and either the third and fourth rectifying diodes or the third and fourth transistor switches.

In an aspect, bridgeless power factor correction boost converter includes a first transistor switch, a second transistor switch, a first diode, a second diode, a boost inductor, a third diode, a fourth diode and an output capacitor. The first transistor switch is coupled to a first terminal of an AC voltage source. The second transistor switch is coupled to a second terminal of the AC voltage source. The first diode includes an anode coupled to the first transistor switch. The second diode includes an anode coupled to the second transistor switch. The boost inductor includes a first terminal coupled to the anode of the first rectifying diode and to the first transistor switch, wherein the boost inductor further includes a second terminal coupled to the anode of the second rectifying diode and to the second transistor switch. The third diode includes a cathode coupled to the first terminal of the AC voltage source. The fourth diode includes a cathode coupled the second terminal of the AC voltage source. The output capacitor includes a first terminal coupled to a cathode of the first diode and to a cathode of the second diode, wherein the output capacitor further includes a second terminal coupled to an anode of the third diode and an anode to the fourth diode. In some embodiments, the first diode and the second diode are each a boost rectifying diode, and the third diode and the fourth diode are each a freewheeling diode. In some embodiments, a first terminal of the first transistor switch is coupled to the first terminal of the boost inductor and to the anode of the first diode, and a second terminal of the first transistor switch is coupled to the first terminal of the AC voltage source and to the cathode of the third diode. In some embodiments, a first terminal of the second transistor switch is coupled to the second terminal of the boost inductor and to the anode of the second diode, and a second terminal of the second transistor switch is coupled to the second terminal of the AC voltage source and to the cathode of the fourth diode. In some embodiments, the first transistor switch and the second transistor switch are each a metal-oxide-semiconductor field effect transistor.

In another aspect, a bridgeless power factor correction boost converter includes a first transistor switch, a second transistor switch, a first diode, a second diode, a boost inductor, a third transistor switch, a fourth transistor switch and an output capacitor. The first transistor switch is coupled to a first terminal of an AC voltage source. The second transistor switch is coupled to a second terminal of the AC voltage source. The first diode includes an anode coupled to the first transistor switch. The second diode includes an anode coupled to the second transistor switch. The boost inductor includes a first terminal coupled to the anode of the first rectifying diode and to the first transistor switch, wherein the boost inductor further includes a second terminal coupled to the anode of the second rectifying diode and to the second transistor switch. The third transistor switch is coupled to the first terminal of the AC voltage source. The fourth transistor switch is coupled the second terminal of the AC voltage source. The output capacitor includes a first terminal coupled to a cathode of the first diode and to a cathode of the second diode, wherein the output capacitor further includes a second terminal coupled to the third transistor switch and to the fourth transistor switch. In some embodiments, the first diode and the second diode each include a boost rectifying diode. In some embodiments, a first terminal of the first transistor is coupled to the first terminal of the boost inductor and to the anode of the first diode, and a second terminal of the first transistor switch is coupled to the first terminal of the AC voltage source and to a first terminal of the third transistor switch. In some embodiments, a first terminal of the second transistor switch is coupled to the second terminal of the boost inductor and to the anode of the second diode, and a second terminal of the second transistor switch is coupled to the second terminal of the AC voltage source and to a first terminal of the fourth transistor switch. In some embodiments, a first terminal of the third transistor switch is coupled to the first transistor switch and to the first terminal of the AC voltage source, and a second terminal of the third transistor switch is coupled to the second terminal of the output capacitor. In some embodiments, a first terminal of the fourth transistor switch is coupled to the second transistor switch and to the second terminal of the AC voltage source, and a second terminal of the fourth transistor switch is coupled to the second terminal of the output capacitor. In some embodiments, the first transistor switch, the second transistor switch, the third transistor switch and the fourth transistor switch are each a metal-oxide-semiconductor field effect transistor.

In yet another aspect, a bridgeless power factor correction boost converter includes a first switching cell and a second switching cell. The first switching cell includes a first transistor, a second transistor, a first diode, a second diode and a first boost inductor. The first transistor switch is coupled to a first terminal of an AC voltage source. The second transistor switch is coupled to a second terminal of the AC voltage source. The first diode includes an anode coupled to the first transistor switch. The second diode includes an anode coupled to the second transistor switch. The first boost inductor includes a first terminal coupled to the anode of the first rectifying diode and to the first transistor switch, wherein the boost inductor further includes a second terminal coupled to the anode of the second rectifying diode and to the second transistor switch. The second switching cell includes a third transistor switch, a fourth transistor switch, a third diode, a fourth diode and a second boost inductor. The third transistor switch is coupled to the first terminal of the AC voltage source. The fourth transistor switch is coupled to the second terminal of the AC voltage source. The third diode includes an anode coupled to the third transistor switch. The fourth diode includes an anode coupled to the fourth transistor switch. The second boost inductor includes a first terminal coupled to the anode of the third rectifying diode and to the third transistor switch, wherein the boost inductor further includes a second terminal coupled to the anode of the fourth rectifying diode and to the fourth transistor switch. The bridgeless power factor correction boost converter also includes a fifth diode, a sixth diode and an output capacitor. The fifth diode includes a cathode coupled to the first terminal of the AC voltage source. The sixth diode includes a cathode coupled the second terminal of the AC voltage source. The output capacitor includes a first terminal coupled to a cathode of the first diode, to a cathode of the second diode, to a cathode of the third diode and to a cathode of the fourth diode, wherein the output capacitor further includes a second terminal coupled to an anode of the fifth diode and to an anode to the sixth diode. In some embodiments, the first diode, the second diode, the third diode and the fourth diode are each a boost rectifying diode, and the fifth diode and the sixth diode are each a freewheeling diode. In some embodiments, a first terminal of the first transistor switch is coupled to the first terminal of the first boost inductor and to the anode of the first diode, and a second terminal of the first transistor switch is coupled to the first terminal of the AC voltage source and to the cathode of the fifth diode. In some embodiments, a first terminal of the second transistor switch is coupled to the second terminal of the first boost inductor and to the anode of the second diode, and a second terminal of the second transistor switch is coupled to the second terminal of the AC voltage source and to the cathode of the sixth diode. In some embodiments, a first terminal of the third transistor switch is coupled to the first terminal of the second boost inductor and to the anode of the third diode, and a second terminal of the third transistor switch is coupled to the first terminal of the AC voltage source and to the cathode of the fifth diode. In some embodiments, a first terminal of the fourth transistor switch is coupled to the second terminal of the second boost inductor and to the anode of the fourth diode, and a second terminal of the fourth transistor switch is coupled to the second terminal of the AC voltage source and to the cathode of the sixth diode. In some embodiments, the first transistor switch, the second transistor switch, the third transistor switch and the fourth transistor switch are each a metal-oxide-semiconductor field effect transistor.

In still yet another aspect, a bridgeless power factor correction boost converter a first switching cell and a second switching cell. The first switching cell includes a first transistor switch, a second transistor switch, a first diode, a second diode and a first boost inductor. The first transistor switch is coupled to a first terminal of an AC voltage source. The second transistor switch is coupled to a second terminal of the AC voltage source. The first diode includes an anode coupled to the first transistor switch. The second diode includes an anode coupled to the second transistor switch. The first boost inductor includes a first terminal coupled to the anode of the first rectifying diode and to the first transistor switch, wherein the boost inductor further includes a second terminal coupled to the anode of the second rectifying diode and to the second transistor switch. The second switching cell includes a third transistor switch, a fourth transistor switch, a third diode, a fourth diode and a second boost inductor. The third transistor switch is coupled to the first terminal of the AC voltage source. The fourth transistor switch is coupled to the second terminal of the AC voltage source. The third diode includes an anode coupled to the third transistor switch. The fourth diode includes an anode coupled to the fourth transistor switch. The second boost inductor includes a first terminal coupled to the anode of the third rectifying diode and to the third transistor switch, wherein the boost inductor further includes a second terminal coupled to the anode of the fourth rectifying diode and to the fourth transistor switch. The bridgeless power factor correction boost converter also includes a fifth transistor, a sixth transistor and an output capacitor. The fifth transistor switch is coupled to the first terminal of the AC voltage source. The sixth transistor switch is coupled the second terminal of the AC voltage source. The output capacitor includes a first terminal coupled to a cathode of the first diode, to a cathode of the second diode, to a cathode of the third diode and to a cathode of the fourth diode, wherein the output capacitor further includes a second terminal coupled to the fifth transistor switch and to the sixth transistor switch. In some embodiments, the first diode, the second diode, the third diode and the fourth diode are each a boost rectifying diode. In some embodiments, a first terminal of the first transistor is coupled to the first terminal of the first boost inductor and to the anode of the first diode, and a second terminal of the first transistor switch is coupled to the first terminal of the AC voltage source and to a first terminal of the fifth transistor switch. In some embodiments, a first terminal of the second transistor switch is coupled to the second terminal of the first boost inductor and to the anode of the second diode, and a second terminal of the second transistor switch is coupled to the second terminal of the AC voltage source and to a first terminal of the sixth transistor switch. In some embodiments, a first terminal of the third transistor is coupled to the first terminal of the second boost inductor and to the anode of the third diode, and a second terminal of the third transistor switch is coupled to the first terminal of the AC voltage source and to a first terminal of the fifth transistor switch. In some embodiments, a first terminal of the fourth transistor switch is coupled to the second terminal of the second boost inductor and to the anode of the fourth diode, and a second terminal of the second transistor switch is coupled to the second terminal of the AC voltage source and to a first terminal of the sixth transistor switch. In some embodiments, a first terminal of the fifth transistor switch is coupled to the first transistor switch, to the third transistor switch and to the first terminal of the AC voltage source, and a second terminal of the fifth transistor switch is coupled to the second terminal of the output capacitor. In some embodiments, a first terminal of the sixth transistor switch is coupled to the second transistor switch, to the fourth transistor switch and to the second terminal of the AC voltage source, and a second terminal of the sixth transistor switch is coupled to the second terminal of the output capacitor. In some embodiments, the first transistor switch, the second transistor switch, the third transistor switch the fourth transistor switch, the fifth transistor switch and the sixth transistor switch are each a metal-oxide-semiconductor field effect transistor.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a bridgeless PFC boost converter. Those of ordinary skill in the art will realize that the following detailed description of the bridgeless PFC boost converter is illustrative only and is not intended to be in any way limiting. Other embodiments of the bridgeless PFC boost converter will readily suggest themselves to such skilled persons having the benefit of this disclosure.

Reference will now be made in detail to implementations of the bridgeless PFC boost converter as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of the bridgeless PFC boost converter are directed to a circuit and method of operating the circuit that provides improved efficiency, reliability and EMI noise performance compared to conventional bridgeless PFC boost converters. The bridgeless PFC boost converter includes either a single switching cell or two identical interleaved switching cells configured to operate 180 degrees out of phase.

Figure 3:
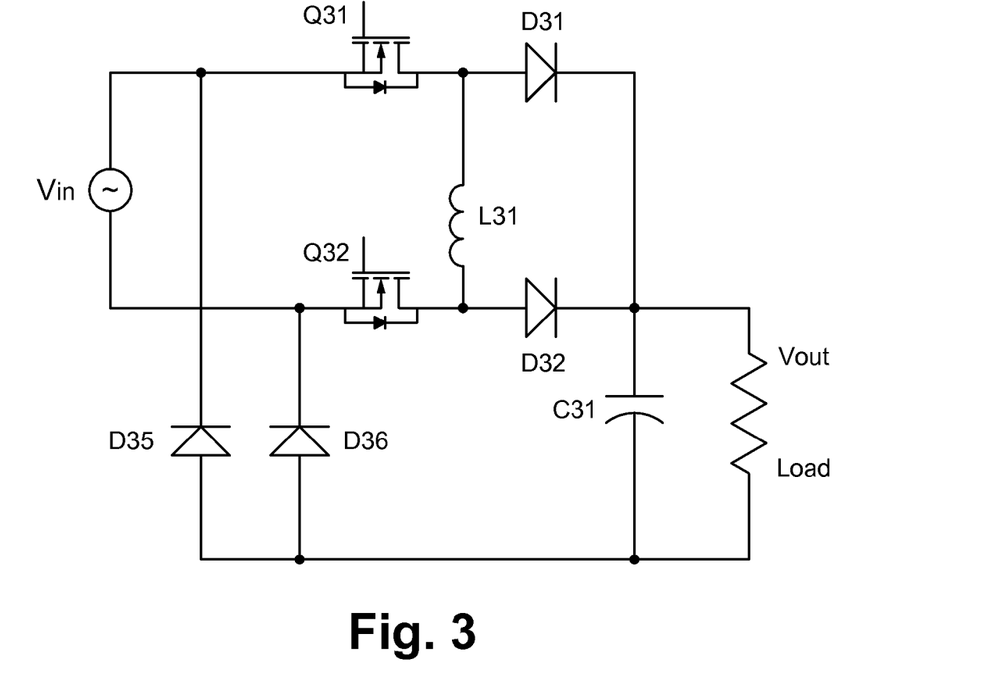
FIG. 3 illustrates a first circuit diagram of a bridgeless power factor correction boost converter according to an embodiment.

FIG. 3 illustrates a first circuit diagram of a bridgeless power factor correction boost converter according to an embodiment. The bridgeless PFC boost converter includes two transistor switches Q31 and Q32, a boost inductor L31, two boost rectifying diodes D31 and D32, an output capacitor C31, and two freewheeling diodes D35 and D36. A first terminal of the transistor switch Q31 is coupled to a first terminal of an input AC voltage source. A second terminal of the transistor switch Q31 is coupled to an anode of the boost rectifying diode D31. A first terminal of the transistor switch Q32 is coupled to a second terminal on the input AC voltage source. A second terminal of the transistor switch Q32 is coupled to an anode of the boost rectifying diode D32. A first terminal of the boost inductor L31 is coupled to a junction node between the second terminal of the transistor switch Q31 and the anode of the boost rectifying diode D31. A second terminal of the boost inductor L31 is coupled to a junction node between the second terminal of the transistor switch Q32 and the anode of the boost rectifying diode D32. A cathode of the boost rectifying diode D31 and a cathode of the boost rectifying diode D32 are coupled to a first terminal of an output capacitor C31. A cathode of the freewheeling diode D35 is coupled to a junction node between the first terminal of the input AC voltage source and the first terminal of the transistor switch Q31. A cathode of the freewheeling diode D36 is coupled to a junction node between the second terminal of the input AC voltage source and the first terminal of the transistor switch Q32. An anode of the freewheeling diode D35 and an anode of the freewheeling diode D36 are coupled to a second terminal of the output capacitor C31. The output capacitor C31 is coupled in parallel to a load. In some embodiments, the anode of the freewheeling diode D35, the anode of the freewheeling diode D36 and the second terminal of the output capacitor C31 are coupled to ground.

Figure 4:
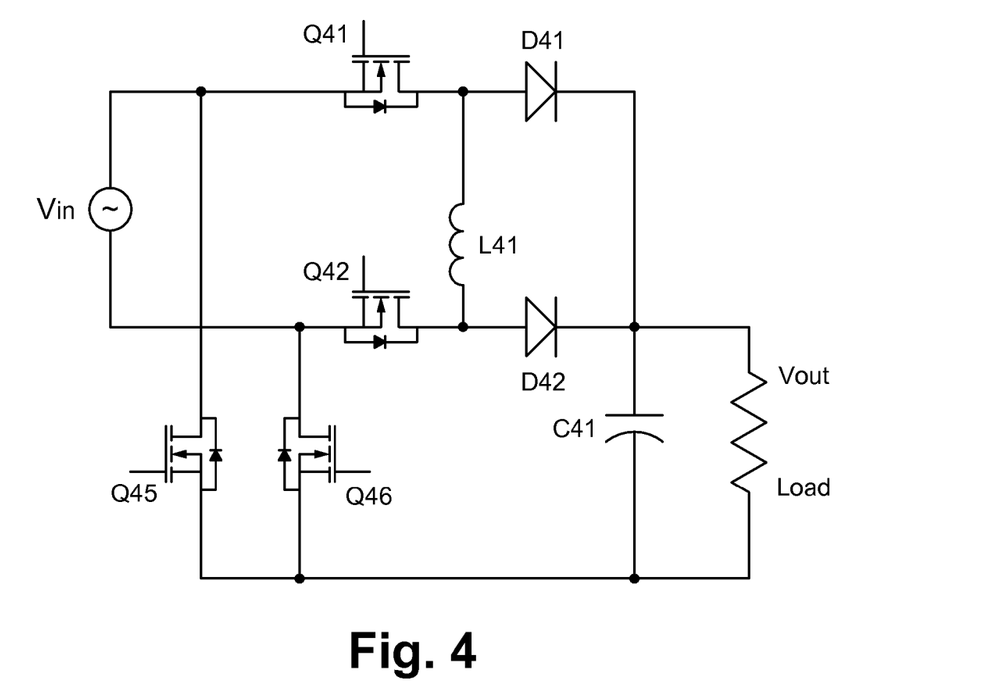
FIG. 4 illustrates a second circuit diagram of a bridgeless power factor correction boost converter according to an embodiment.

In some embodiments, each of the transistor switches Q31, Q32, Q35, Q36 are metal-oxide-semiconductor field-effect transistors (MOSFETs). Alternatively, other types of semiconductor transistors can be used. Each of the transistor switches Q31, Q32, Q35, Q36 are controlled by a driving signal, such as a pulse width modulated (PWM) driving signal, applied to a gate of the transistor switch.

During a positive half-cycle of the input AC voltage Vin, a body diode of the transistor switch Q31 is forward-biased conducting, thus the transistor switch Q31 is not controlled by the PWM driving signal at the gate of the transistor switch Q31. The transistor switch Q32 functions as a switch and is controlled by the PWM driving signal. When the transistor switch Q32 is switched on, current flows through the transistor switch Q31, the boost inductor L31 and the transistor switch Q32. During the on time of the transistor switch Q32, the input AC voltage Vin is applied directly to the boost inductor L31, so the current flowing through the boost inductor L31 increases and the boost inductor L31 is energized. When the transistor switch Q32 is switched off, current flows through the transistor switch Q31, the boost inductor L31, the boost rectifying diode D32, the output capacitor C31 and the freewheeling diode D36, thereby de-energizing the boost inductor L31 and charging the output capacitor C31. The voltage across the charged output capacitor C31 is applied to the load.

During a negative half-cycle of the input AC voltage Vin, a body diode of the transistor switch Q32 is forward-biased conducting, thus the transistor switch Q32 is not controlled by the PWM driving signal at the gate of the transistor switch Q32. The transistor switch Q31 functions as a switch and is controlled by the PWM driving signal. When the transistor switch Q31 is switched on, current flows through the transistor switch Q32, the boost inductor L31 and the transistor switch Q31. During the on time of the transistor switch Q31, the input AC voltage Vin is applied directly to the boost inductor L31, so the current flowing through boost inductor L31 increases and the boost inductor L31 is energized. When the transistor switch Q31 is switched off, current flows through the transistor switch Q32, the boost inductor L31, the boost rectifying diode D31, the output capacitor C31 and the freewheeling diode D35, thereby de-energizing the boost inductor L31 and charging the output capacitor C31. The voltage across the charged output capacitor C31 is applied to the load.

Based on the operation description above, when the transistor switch Q32 is switched on during the positive half-cycle of the input AC voltage Vin, and when the transistor switch Q31 is switched on during the negative half-cycle of the input AC voltage Vin, current flows through two transistor switches, one inductor and one diode. When the transistor switch Q32 is switched off during the positive half-cycle of the input AC voltage Vin, and when the transistor switch Q31 is switched off during the negative half-cycle of the input AC voltage Vin, current flows through one transistor switch, one inductor and two diodes. So in either case, the current path includes three semiconductor devices, where a semiconductor device is considered either a transistor switch or a diode.

Compared to the conventional PFC boost converter of FIG. 2, the bridgeless PFC boost converter of FIG. 3 reduces the number of semiconductor devices in the inductor charging-current and discharging-current path from four to three, lowering conduction loss by about one diode-junction voltage drop (VF). This will increase the efficiency greatly.

The transistor switches conduct as either a high-frequency switches or a low-frequency half-wave rectifiers operating on alternate ac half-cycles. As a result, some of the power losses normally handled by an AC bridge rectifier are now transferred to the transistor switches in the bridgeless configuration, thereby increasing the efficiency since the transistor switches have very low on state resistance.

Unlike conventional bridgeless PFC boost converters which usually have poor EMI performance, the bridgeless PFC boost converter in FIG. 3 has very good EMI performance, more in line with conventional PFC boost converters that use an AC bridge rectifier.

The bridgeless PFC boost converter of FIG. 3 can be modified to replace the freewheeling diodes D35 and D36 with transistor switches. FIG. 4 illustrates a second circuit diagram of a bridgeless power factor correction boost converter according to an embodiment. The bridgeless PFC boost converter of FIG. 4 is configured similarly as the bridgeless PFC boost converter of FIG. 3 except that the freewheeling diodes D35 and D36 of the bridgeless PFC boost converter of FIG. 3 are replaced by transistor switches Q45 and Q46, respectively, in the bridgeless PFC boost converter of FIG. 4. Operation of the bridgeless PFC boost converter of FIG. 4 is similar to that of the bridgeless PFC boost converter of FIG. 3, where during the positive half-cycle of the input AC voltage Vin, a body diode of both the transistor switches Q41 and Q45 are forward-biased conducting. The transistor switches Q41 and Q45 can also be turned on with an always high driving signal to achieve low on state resistance. During the negative half-cycle of the input AC voltage Vin, a body diode of both the transistor switches Q42 and Q46 are forward-biased conducting. The transistor switches Q42 and Q46 can also be turned on with an always high driving signal to achieve low on state resistance. Using transistor switches instead of freewheeling diodes further improves the circuit efficiency.

The bridgeless PFC boost converters of FIGS. 3 and 4 each include a single switching cell. The switching cell in the bridgeless PFC boost converter of FIG. 3 includes the transistor switches Q31, Q32, the boost inductor L31 and the boost rectifying diodes D31, D32. In some embodiments, a bridgeless PFC boost converter is configured having two interleaved switching cells.

Figure 5:
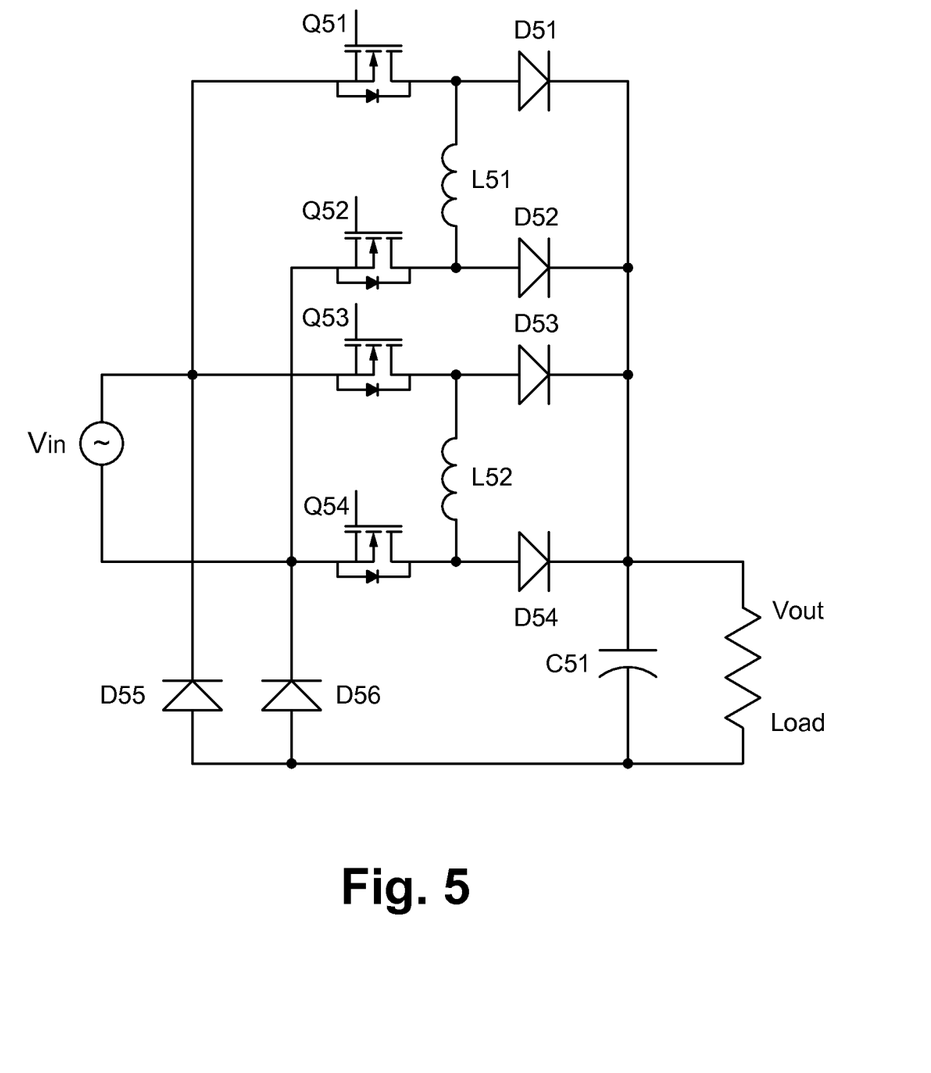
FIG. 5 illustrates a first circuit diagram of a bridgeless power factor correction boost converter having two interleaved switching cells according to an embodiment.

FIG. 5 illustrates a first circuit diagram of a bridgeless power factor correction boost converter having two interleaved switching cells according to an embodiment. The bridgeless PFC boost converter includes two identical switching cells. A first switching cell includes two transistor switches Q51 and Q52, a boost inductor L51 and two boost rectifying diodes D51 and D52. The first switching cell is configured similarly as the single switching cell in the bridgeless PFC boost converter of FIG. 3. The first switching cell is coupled to an input AC voltage source and an output capacitor C51 in a manner similar to the single switching cell of FIG. 3 coupled to the input AC voltage source and the output capacitor C31. A second switching cell includes two transistor switches Q53 and Q54, a boost inductor L52 and two boost rectifying diodes D53 and D54. The second switching cell is configured similarly as the single switching cell in the bridgeless PFC boost converter of FIG. 3. The second switching cell is coupled to the input AC voltage source and the output capacitor C51 in a manner similar to the single switching cell of FIG. 3 coupled to the input AC voltage source and the output capacitor C31. As such, the cathode of each of the boost rectifying diodes D51, D52, D53, D54 are coupled to the first terminal of the output capacitor C51. The two switching cell configuration differs from the single switching cell configuration in that a cathode of a freewheeling diode D55 is coupled to a first terminal of both the transistor switch Q51 in the first switching cell and the transistor Q53 in the second switching cell, and a cathode of a freewheeling diode D56 is coupled to a first terminal of both the transistor switch Q52 in the first switching cell and the transistor Q54 in the second switching cell. The cathode of the freewheeling diode D55 is also coupled to the first terminal of the input AC voltage source. The cathode of the freewheeling diode D56 is also coupled to the second terminal of the input AC voltage source.

Each of the first and second switching cells operate in the same manner as the single switching cell of FIG. 3, but the first and second switching cells are 180 degrees out of phase.

Figure 6:
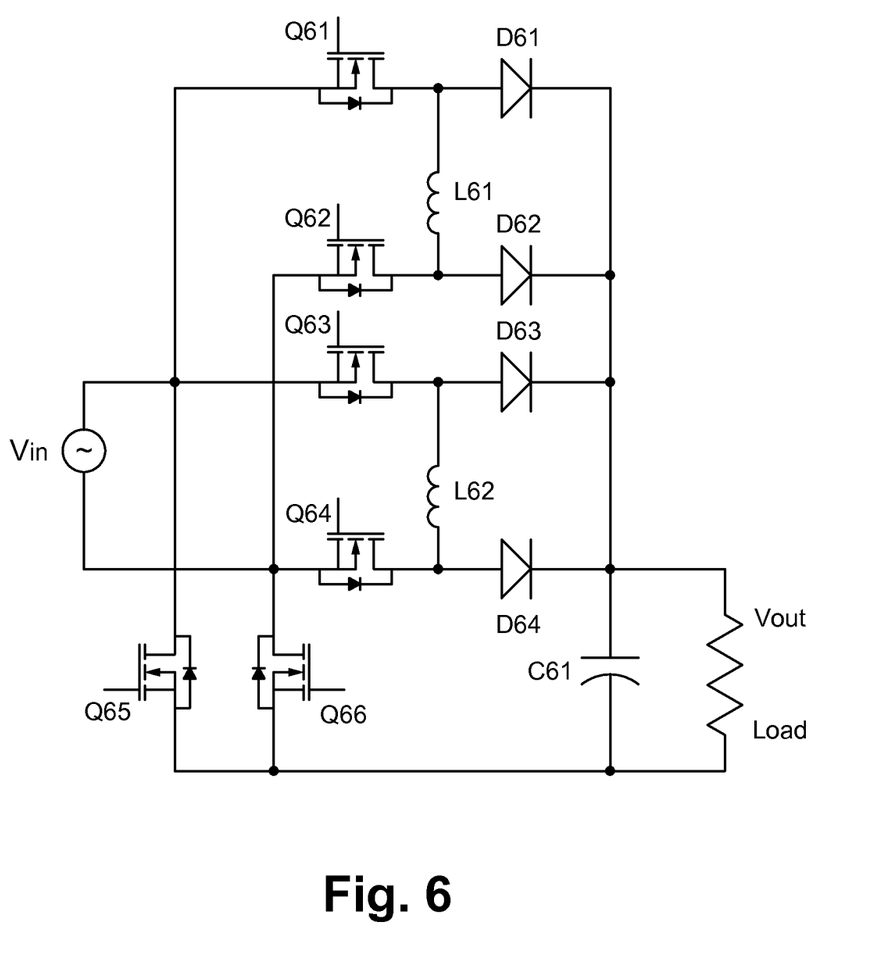
FIG. 6 illustrates a second circuit diagram of a bridgeless power factor correction boost converter having two interleaved switching cells according to an embodiment.

The bridgeless PFC boost converter of FIG. 5 can be modified to replace the freewheeling diodes D55 and D56 with transistor switches. FIG. 6 illustrates a second circuit diagram of a bridgeless power factor correction boost converter having two interleaved switching cells according to an embodiment. The bridgeless PFC boost converter of FIG. 6 is configured similarly as the bridgeless PFC boost converter of FIG. 5 except that the freewheeling diodes D55 and D56 of the bridgeless PFC boost converter of FIG. 5 are replaced by transistor switches Q65 and Q66, respectively, in the bridgeless PFC boost converter of FIG. 6. Operation of the bridgeless PFC boost converter of FIG. 6 is similar to that of the bridgeless PFC boost converter of FIG. 5, where during the positive half-cycle of the input AC voltage Vin, a body diode of both the transistor switches Q61, Q64 and Q65 are forward-biased conducting. The transistor switches Q61, Q64 and Q65 can also be turned on with an always high driving signal to achieve low on state resistance. During the negative half-cycle of the input AC voltage Vin, a body diode of both the transistor switches Q62, Q63 and Q66 are forward-biased conducting. The transistor switches Q62, Q63 and Q66 can also be turned on with an always high driving signal to achieve low on state resistance. Using transistor switches instead of freewheeling diodes further improves the circuit efficiency.

The present application has been described in terms of specific embodiments incorporating details to facilitate the understanding of the principles of construction and operation of the bridgeless PFC boost converter. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A bridgeless power factor correction boost converter comprising:
    a. a first transistor switch coupled to a first terminal of an AC voltage source;
    b. a second transistor switch coupled to a second terminal of the AC voltage source;
    c. a first diode comprising an anode coupled to the first transistor switch;
    d. a second diode comprising an anode coupled to the second transistor switch;
    e. a boost inductor comprising a first terminal coupled to the anode of the first diode and to the first transistor switch, wherein the boost inductor further comprises a second terminal coupled to the anode of the second diode and to the second transistor switch;
    f. a third diode comprising a cathode coupled to the first terminal of the AC voltage source;
    g. a fourth diode comprising a cathode coupled the second terminal of the AC voltage source; and
    h. an output capacitor comprising a first terminal coupled to a cathode of the first diode and to a cathode of the second diode, wherein the output capacitor further comprises a second terminal coupled to an anode of the third diode and an anode to the fourth diode.

2. The bridgeless power factor correction boost converter of claim 1 wherein the first diode and the second diode each comprise a boost rectifying diode, and the third diode and the fourth diode each comprise a freewheeling diode.

3. The bridgeless power factor correction boost converter of claim 1 wherein a first terminal of the first transistor switch is coupled to the first terminal of the boost inductor and to the anode of the first diode, and a second terminal of the first transistor switch is coupled to the first terminal of the AC voltage source and to the cathode of the third diode.

4. The bridgeless power factor correction boost converter of claim 1 wherein a first terminal of the second transistor switch is coupled to the second terminal of the boost inductor and to the anode of the second diode, and a second terminal of the second transistor switch is coupled to the second terminal of the AC voltage source and to the cathode of the fourth diode.

5. The bridgeless power factor correction boost converter of claim 1 wherein the first transistor switch and the second transistor switch each comprise a metal-oxide-semiconductor field effect transistor.

6. A bridgeless power factor correction boost converter comprising:
    a. a first transistor switch coupled to a first terminal of an AC voltage source;
    b. a second transistor switch coupled to a second terminal of the AC voltage source;
    c. a first diode comprising an anode coupled to the first transistor switch;
    d. a second diode comprising an anode coupled to the second transistor switch;
    e. a boost inductor comprising a first terminal coupled to the anode of the first diode and to the first transistor switch, wherein the boost inductor further comprises a second terminal coupled to the anode of the second diode and to the second transistor switch;
    f. a third transistor switch coupled to the first terminal of the AC voltage source;
    g. a fourth transistor switch coupled the second terminal of the AC voltage source; and
    h. an output capacitor comprising a first terminal coupled to a cathode of the first diode and to a cathode of the second diode, wherein the output capacitor further comprises a second terminal coupled to the third transistor switch and to the fourth transistor switch.

7. The bridgeless power factor correction boost converter of claim 6 wherein the first diode and the second diode each comprise a boost rectifying diode.

8. The bridgeless power factor correction boost converter of claim 6 wherein a first terminal of the first transistor is coupled to the first terminal of the boost inductor and to the anode of the first diode, and a second terminal of the first transistor switch is coupled to the first terminal of the AC voltage source and to a first terminal of the third transistor switch.

9. The bridgeless power factor correction boost converter of claim 6 wherein a first terminal of the second transistor switch is coupled to the second terminal of the boost inductor and to the anode of the second diode, and a second terminal of the second transistor switch is coupled to the second terminal of the AC voltage source and to a first terminal of the fourth transistor switch.

10. The bridgeless power factor correction boost converter of claim 6 wherein a first terminal of the third transistor switch is coupled to the first transistor switch and to the first terminal of the AC voltage source, and a second terminal of the third transistor switch is coupled to the second terminal of the output capacitor.

11. The bridgeless power factor correction boost converter of claim 6 wherein a first terminal of the fourth transistor switch is coupled to the second transistor switch and to the second terminal of the AC voltage source, and a second terminal of the fourth transistor switch is coupled to the second terminal of the output capacitor.

12. The bridgeless power factor correction boost converter of claim 1 wherein the first transistor switch, the second transistor switch, the third transistor switch and the fourth transistor switch each comprise a metal-oxide-semiconductor field effect transistor.

13. A bridgeless power factor correction boost converter comprising:
   a. a first switching cell comprising:
      i. a first transistor switch coupled to a first terminal of an AC voltage source;
      ii. a second transistor switch coupled to a second terminal of the AC voltage source;
      iii. a first diode comprising an anode coupled to the first transistor switch;
      iv. a second diode comprising an anode coupled to the second transistor switch; and
      v. a first boost inductor comprising a first terminal coupled to the anode of the first diode and to the first transistor switch, wherein the boost inductor further comprises a second terminal coupled to the anode of the second diode and to the second transistor switch; and
   b. a second switching cell comprising:
      i. a third transistor switch coupled to the first terminal of the AC voltage source;
      ii. a fourth transistor switch coupled to the second terminal of the AC voltage source;
      iii. a third diode comprising an anode coupled to the third transistor switch;
      iv. a fourth diode comprising an anode coupled to the fourth transistor switch; and
      v. a second boost inductor comprising a first terminal coupled to the anode of the third diode and to the third transistor switch, wherein the boost inductor further comprises a second terminal coupled to the anode of the fourth diode and to the fourth transistor switch; and
   c. a fifth diode comprising a cathode coupled to the first terminal of the AC voltage source;
   d. a sixth diode comprising a cathode coupled the second terminal of the AC voltage source; and
   e. an output capacitor comprising a first terminal coupled to a cathode of the first diode, to a cathode of the second diode, to a cathode of the third diode and to a cathode of the fourth diode, wherein the output capacitor further comprises a second terminal coupled to an anode of the fifth diode and to an anode to the sixth diode.

14. The bridgeless power factor correction boost converter of claim 13 wherein the first diode, the second diode, the third diode and the fourth diode each comprise a boost rectifying diode, and the fifth diode and the sixth diode each comprise a freewheeling diode.

15. The bridgeless power factor correction boost converter of claim 13 wherein a first terminal of the first transistor switch is coupled to the first terminal of the first boost inductor and to the anode of the first diode, and a second terminal of the first transistor switch is coupled to the first terminal of the AC voltage source and to the cathode of the fifth diode.

16. The bridgeless power factor correction boost converter of claim 13 wherein a first terminal of the second transistor switch is coupled to the second terminal of the first boost inductor and to the anode of the second diode, and a second terminal of the second transistor switch is coupled to the second terminal of the AC voltage source and to the cathode of the sixth diode.

17. The bridgeless power factor correction boost converter of claim 13 wherein a first terminal of the third transistor switch is coupled to the first terminal of the second boost inductor and to the anode of the third diode, and a second terminal of the third transistor switch is coupled to the first terminal of the AC voltage source and to the cathode of the fifth diode.

18. The bridgeless power factor correction boost converter of claim 13 wherein a first terminal of the fourth transistor switch is coupled to the second terminal of the second boost inductor and to the anode of the fourth diode, and a second terminal of the fourth transistor switch is coupled to the second terminal of the AC voltage source and to the cathode of the sixth diode.

19. The bridgeless power factor correction boost converter of claim 1 wherein the first transistor switch, the second transistor switch, the third transistor switch and the fourth transistor switch each comprise a metal-oxide-semiconductor field effect transistor.

20. A bridgeless power factor correction boost converter comprising:
   a. a first switching cell comprising:
      i. a first transistor switch coupled to a first terminal of an AC voltage source;
      ii. a second transistor switch coupled to a second terminal of the AC voltage source;
      iii. a first diode comprising an anode coupled to the first transistor switch;
      iv. a second diode comprising an anode coupled to the second transistor switch; and
      v. a first boost inductor comprising a first terminal coupled to the anode of the first diode and to the first transistor switch, wherein the boost inductor further comprises a second terminal coupled to the anode of the second diode and to the second transistor switch; and
   b. a second switching cell comprising:
      i. a third transistor switch coupled to the first terminal of the AC voltage source;
      ii. a fourth transistor switch coupled to the second terminal of the AC voltage source;
      iii. a third diode comprising an anode coupled to the third transistor switch;
      iv. a fourth diode comprising an anode coupled to the fourth transistor switch; and
      v. a second boost inductor comprising a first terminal coupled to the anode of the third diode and to the third transistor switch, wherein the boost inductor further comprises a second terminal coupled to the anode of the fourth diode and to the fourth transistor switch; and
   c. a fifth transistor switch coupled to the first terminal of the AC voltage source;
   d. a sixth transistor switch coupled the second terminal of the AC voltage source; and
   e. an output capacitor comprising a first terminal coupled to a cathode of the first diode, to a cathode of the second diode, to a cathode of the third diode and to a cathode of the fourth diode, wherein the output capacitor further comprises a second terminal coupled to the fifth transistor switch and to the sixth transistor switch.

21. The bridgeless power factor correction boost converter of claim 20 wherein the first diode, the second diode, the third diode and the fourth diode each comprise a boost rectifying diode.

22. The bridgeless power factor correction boost converter of claim 20 wherein a first terminal of the first transistor is coupled to the first terminal of the first boost inductor and to the anode of the first diode, and a second terminal of the first transistor switch is coupled to the first terminal of the AC voltage source and to a first terminal of the fifth transistor switch.

23. The bridgeless power factor correction boost converter of claim 20 wherein a first terminal of the second transistor switch is coupled to the second terminal of the first boost inductor and to the anode of the second diode, and a second terminal of the second transistor switch is coupled to the second terminal of the AC voltage source and to a first terminal of the sixth transistor switch.

24. The bridgeless power factor correction boost converter of claim 20 wherein a first terminal of the third transistor is coupled to the first terminal of the second boost inductor and to the anode of the third diode, and a second terminal of the third transistor switch is coupled to the first terminal of the AC voltage source and to a first terminal of the fifth transistor switch.

25. The bridgeless power factor correction boost converter of claim 20 wherein a first terminal of the fourth transistor switch is coupled to the second terminal of the second boost inductor and to the anode of the fourth diode, and a second terminal of the second transistor switch is coupled to the second terminal of the AC voltage source and to a first terminal of the sixth transistor switch.

26. The bridgeless power factor correction boost converter of claim 20 wherein a first terminal of the fifth transistor switch is coupled to the first transistor switch, to the third transistor switch and to the first terminal of the AC voltage source, and a second terminal of the fifth transistor switch is coupled to the second terminal of the output capacitor.

27. The bridgeless power factor correction boost converter of claim 20 wherein a first terminal of the sixth transistor switch is coupled to the second transistor switch, to the fourth transistor switch and to the second terminal of the AC voltage source, and a second terminal of the sixth transistor switch is coupled to the second terminal of the output capacitor.

28. The bridgeless power factor correction boost converter of claim 20 wherein the first transistor switch, the second transistor switch, the third transistor switch the fourth transistor switch, the fifth transistor switch and the sixth transistor switch each comprise a metal-oxide-semiconductor field effect transistor.

* * * * *